United States Patent
Mosko

(10) Patent No.: US 11,803,645 B2
(45) Date of Patent: Oct. 31, 2023

(54) SYSTEM AND METHOD FOR MODELING A SHARED RESOURCE IN A MULTI-LAYER REASONING GRAPH BASED ON CONFIGURATION SECURITY

(71) Applicant: Palo Alto Research Center Incorporated, Palo Alto, CA (US)

(72) Inventor: Marc E. Mosko, Santa Cruz, CA (US)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 17/199,988

(22) Filed: Mar. 12, 2021

(65) Prior Publication Data

US 2022/0292199 A1    Sep. 15, 2022

(51) Int. Cl.
    *G06F 21/57* (2013.01)
(52) U.S. Cl.
    CPC ...... *G06F 21/577* (2013.01); *G06F 2221/034* (2013.01)
(58) Field of Classification Search
    CPC ............. G06F 21/577; G06F 2221/034; H04L 63/1433
    See application file for complete search history.

(56) References Cited

U.S. PATENT DOCUMENTS

| | | | |
|---|---|---|---|
| 9,684,865 B1* | 6/2017 | Ezick | G06N 5/02 |
| 11,265,292 B1* | 3/2022 | Leviseur | H04L 63/0263 |
| 2018/0210927 A1* | 7/2018 | Karam | G06F 16/24568 |
| 2020/0053116 A1* | 2/2020 | Soroush | H04L 43/045 |
| 2021/0014264 A1* | 1/2021 | Soroush | H04L 63/1433 |

* cited by examiner

*Primary Examiner* — Meng Li
(74) *Attorney, Agent, or Firm* — Shun Yao; YAO LEGAL SERVICES, INC.

(57) ABSTRACT

Embodiments provide a system and method for modeling a shared resource in a multi-layer reasoning graph based on configuration security. During operation, the system can obtain a multi-layer graph for a system with a plurality of components that can include a set of subgroups of components. The system can generate, based on the multi-layer graph, an abstract component to represent a shared resource model for a respective subgroup of components. The shared resource model can be associated with a set of resource constraints. The system can generate a set of values for resource configuration parameters that satisfy the resource constraints. The system can map the shared resource model to a respective component and can then determine, based on the mapping and the set of values for the resource configuration parameters, a set of values for the component configuration parameters thereby facilitating optimization of a security objective function.

18 Claims, 12 Drawing Sheets

SYSTEM AND METHOD FOR MODELING A SHARED RESOURCE IN A MULTI-LAYER REASONING GRAPH BASED ON CONFIGURATION SECURITY

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

RELATED APPLICATIONS

This application is related to:

U.S. Provisional Application No. 62/873,746, entitled "System and Method for Improving the Security Versus Functionality Tradeoff of a Composed Internet of Things System," by inventors Hamed Soroush and Shantanu Rane, filed 12 Jul. 2019, which subject matter is related to the subject matter in U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 (hereinafter "U.S. patent application Ser. No. 16/219,774"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,966, entitled "System and Method for Extracting Configuration Information for Reasoning About the Security and Functionality of a Composed Internet of Things System," by inventors Hamed Soroush, Milad Asgari Mehrabadi, and Shantanu Rane, filed 1 Jul. 2020 (hereinafter "U.S. patent application Ser. No. 16/918,966");

U.S. patent application Ser. No. 16/918,971, entitled "System and Method for Constructing a Graph-Based Model for Optimizing the Security Posture of a Composed Internet of Things System," by inventors Hamed Soroush, Milad Asgari Mehrabadi, and Shantanu Rane, filed on 1 Jul. 2020 (hereinafter "U.S. patent application Ser. No. 16/918,971");

U.S. patent application Ser. No. 16/923,763, entitled "System and Method for Reasoning about the Optimality of a Configuration Parameter of a Distributed System," by inventors Hamed Soroush and Shantanu Rane, filed on 8 Jul. 2020 (hereinafter "U.S. patent application Ser. No. 16/923,763"); and U.S. patent application Ser. No. 16/925,063, entitled "System and Method for Generating Evidence for the Superiority of a Distributed System Configuration," by inventors Hamed Soroush and Shantanu Rane, filed on 9 Jul. 2020 (hereinafter "U.S. patent application Ser. No. 16/925,063"), the disclosures of which are herein incorporated by reference in their entirety.

BACKGROUND

Field

This disclosure is generally related to improving the security versus functionality tradeoff. More specifically, this disclosure is related to a system and method for modeling a shared resource in a multi-layer reasoning graph based on configuration security.

Related Art

As cyber systems become increasingly complex and connected, configuration analytics may play a critical role in the correct and secure operation of cyber systems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, these solutions lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they provide functional dependencies between the interconnected system components or devices.

SUMMARY

The embodiments described herein provide a system and method for modeling a shared resource in a multi-layer reasoning graph based on configuration security. During operation, the system can obtain a multi-layer graph for a system with a plurality of components. The plurality of components can include a set of subgroups of components with each component associated with set of component configuration parameters. The system can generate, based on the multi-layer graph, an abstract component to represent a shared resource model for a respective subgroup of components. The shared resource model can be associated with a set of resource configuration parameters and a set of resource constraints. The set of resource constraints can indicate relationships between the set of resource configuration parameters. The system can generate a set of values for the resource configuration parameters that satisfy the resource constraints. The system can apply a mapping between the shared resource model and a respective component in the subgroup of components. The system can then determine, based on the mapping and the set of values for the resource configuration parameters, a set of values for the component configuration parameters thereby facilitating optimization of a security objective function.

In a variation of this embodiment, a component includes one or more of: a software component; a hardware component; a middleware component; and a networking component.

In a variation on this embodiment, the system can generate the set of resource configuration parameter values that satisfy the resource constraints by determining a set of allowed values for a respective resource configuration parameter; determining a set of relationships between the set of resource configuration parameters; applying, based on the set of relationships, the set of resource constraints to the set of resource configuration parameters. The constraint relationships can include security constraints and functionality constraints. The functionality constraints can represent functionality requirements associated with the shared resource model.

In a further variation on this embodiment, the security objective function can correspond to reducing a size of an attack surface of the system.

In a further variation on this embodiment, the system can determine, based on the mapping and the set of values for the resource configuration parameters, the set of values for the component configuration parameters thereby facilitating optimization of the security objective functions by: determining a set of allowed values for each component configuration parameter in the set of component configuration parameters; determining a set of relationships between the set of component configuration parameters; and applying, based on the set of relationships, a set of component constraints to the set of component configuration parameters. The component constraints include security constraints and functionality constraints. The functionality constraints can represent functionality requirements associated with the component.

In a variation on this embodiment, the security constraints can include one or more of: a positive expression of known security vulnerabilities or negation of predicates corresponding to the known security vulnerabilities, wherein the known security vulnerabilities are obtained from a public or a proprietary database; a positive expression of bad security practices or a negation of predicates corresponding to the bad security practices; and a positive expression of best security practices or a negation of predicates corresponding to the best security practices.

In a further variation on this embodiment, the system can determine, based on the mapping and the set of values for the resource configuration parameters, the set of values for the component configuration parameters thereby facilitating optimization of the security objective function by applying a Satisfiability Modulo Theory (SMT) solver.

In a further variation on this embodiment, the system can apply the SMT solver to satisfy the component constraints and the resource constraints for at least a subset of the set of component configuration parameters and a corresponding set of values allowed by a surjective mapping.

In a further variation on this embodiment, the shared resource model includes one or more of: an intersection of two or more shared resource model; and a union of two or more shared resource models.

In a further variation on this embodiment, the system can apply the mapping between the shared resource model and the respective component in the subgroup of components by applying one or more of: an injective mapping from a respective component in the subgroup of components to the shared resource model; and a surjective mapping from the shared resource model to the respective subgroup of components.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 2B-1 and 2B-2 illustrate an exemplary multi-layer graph corresponding to the network diagram of FIG. 2A, in accordance with an embodiment of the present application.

DETAILED DESCRIPTION

Figure 1:
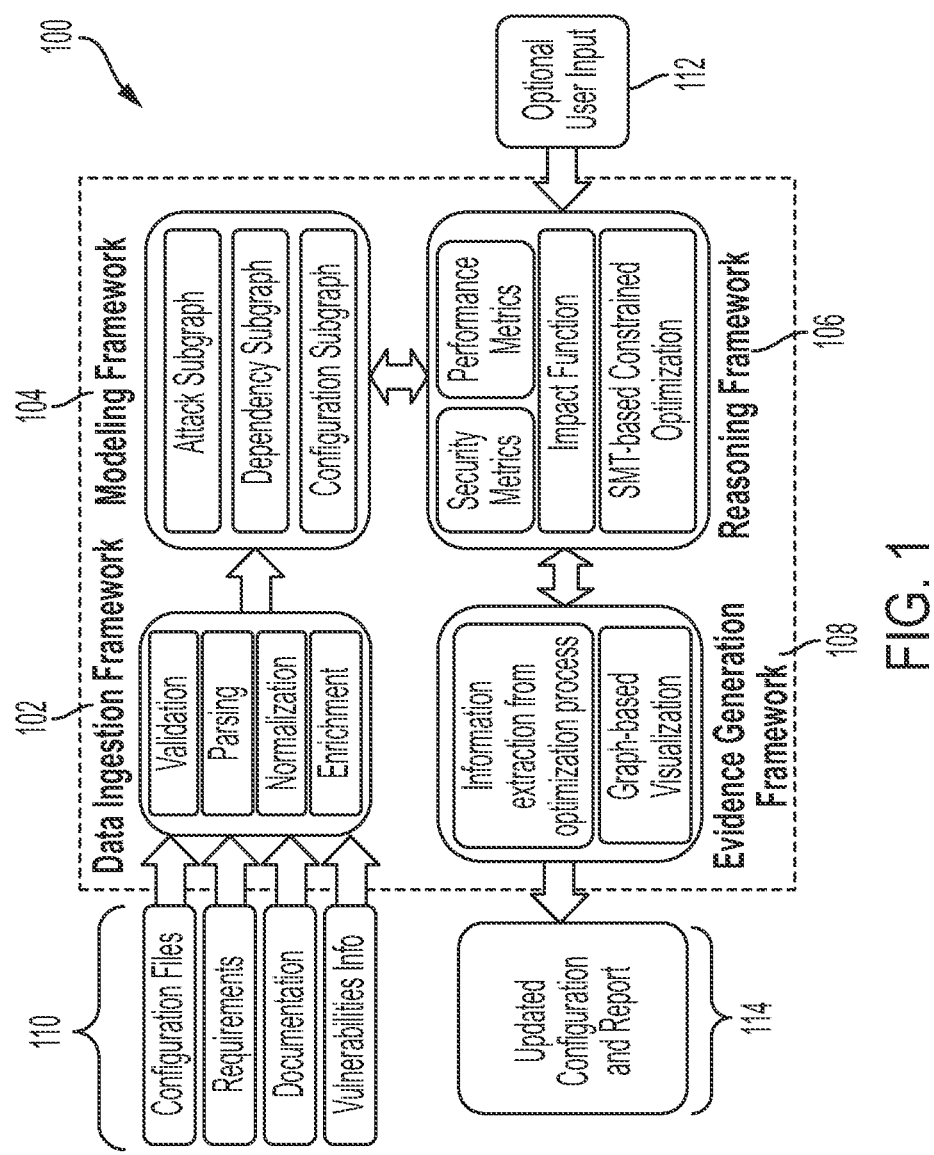
FIG. 1 illustrates an exemplary environment for facilitating an improvement in the security versus functionality tradeoff of a composed system, in accordance with an embodiment of the present application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

The embodiments described herein provide a system which models a shared resource in a multi-layer reasoning graph based on configuration security, in accordance with an embodiment of the present application. Modeling a shared resource model in a multi-layer reasoning graph can be part of a reasoning framework or module, that is one of the four modules of a larger system described in U.S. patent application Ser. No. 16/219,774. In one embodiment, the overall system can apply the reasoning framework to determine an optimized or a feasible assignment of values to a set of component configuration parameters and resource configuration parameters in the configuration subgraph.

This larger or overall system can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

The overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks. The modeling framework can take as input the data ingested and extracted by the data ingestion module. Extracted configuration information can be used to generate the configuration subgraph, extracted vulnerability information can be used to generate the vulnerability subgraph and extracted dependency information can be used to generate the dependency subgraph. Using these three subgraphs (and the various dependencies and relationships both within and across the components), the system can provide an optimal set of configuration parameter values. Determining this optimal set of configuration parameter values can be based on achieving a particular security objective function, such as reducing the size of the attack surface of the overall network or serving a particular operational context. The modeling framework is described in U.S. patent application Ser. No. 16/918,971, and the data ingestion framework is described in U.S. patent application Ser. No. 16/918,966.

The overall system also uses algorithms and software tools to jointly analyze the subgraphs of the multi-layer graph to reason about the impact of a candidate configuration set on the security and functionality of the composed system, e.g., by using a Satisfiability Modulo Theory (SMT) solver to express the complex relationships among the configuration parameters as constraints in a security optimization problem. The reasoning framework is described in U.S. patent application Ser. No. 16/923,763.

In the overall system of reasoning about configuration security, often two devices may need to share a resource. The overall system may include a mechanism to ensure that the parameter spaces on each device is interoperable and secure, e.g., the mechanism may model the parameter space on each of the two devices that need to share a resource to ensure that the two parameter spaces between two devices is interoperable and secure. In other words, the overall system can develop a model that can map configuration parameters between two devices. Such an approach applies one-to-one mappings of parameter spaces and may not scale beyond a few devices sharing the same resource.

In the embodiments described herein, an overall system is provided that can model a shared resource in a multi-layer graph based on configuration security. Specifically, the overall system applies a model-based approach in which a shared resource is initially modeled in a general form. The overall system can constrain the general form of the shared resource model based on the capabilities and configuration parameters on each component in a sub-group of components in the overall system. The overall system can then map the constrained shared resource model to each component in the subgroup of components. The system can determine, based on the mapping, a feasible assignment of a set of shared resource configuration parameters. The overall system can then derive a shared resource model that can represent a common interoperable and a secure configuration resource.

The terms "framework" and "module" are used interchangeably in this disclosure and refer to a component or unit of the "overall system" or "SCIBORG." A framework or module can be associated with various operations and functions, as described herein.

The term "overall system" refers to SCIBORG, which includes the four frameworks (i.e., data ingestion framework, modeling framework, reasoning framework, and evidence generation framework). The terms "reasoning framework" and "reasoning module" are used interchangeably in this disclosure and refer to one of the four frameworks of the overall system or SCIBORG. The term "system" can refer to the overall system or the reasoning module/framework.

The terms "vulnerability graph" and "attack graph" are used interchangeably in this disclosure and refer to one of the three subgraphs of the generated multi-layer graph.

The terms "graph" and "subgraph" are used interchangeably in this disclosure to describe the three graphs or subgraphs which make up the generated multi-layer graph of the described embodiments, i.e., the configuration graph or subgraph; the vulnerability graph or subgraph; and the dependency graph or subgraph.

System Architecture

FIG. 1 illustrates an exemplary environment for facilitating an improvement in the security versus functionality trade-off of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108.

Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 of the overall system can construct a multi-layer graph for a system with a plurality of components. The components can include, e.g., a software component, a hardware component, a middleware component, and a networking component. The constructed multi-layer graph can include a configuration subgraph, a vulnerability subgraph, and a dependency subgraph. Modeling framework 104 can construct the multi-layer graph by generating nodes in each of the three subgraphs as well as directed edges between nodes in a same graph or between nodes in different subgraphs.

In the configuration subgraph, modeling framework 104 can generate nodes in a first class and a second class. The nodes in the first class can encode information associated with a configuration parameter for a respective component. Examples of the encoded information can include: a name for the respective component; a default value for the respective component; a range of values for the respective component; and a data type for the respective component. The nodes in the second class can encode value assignments for configuration parameters and relationships between configuration parameters, including: relationships among configuration parameters within components; and relationships among configuration parameters across components.

In the vulnerability subgraph, modeling framework 104 can generate nodes by identifying and encoding three types of vulnerabilities. First, modeling framework 104 can identify and encode known vulnerabilities associated with a component as a first set of known vulnerabilities, which are obtained from a public or a proprietary database (e.g., from the National Vulnerability Database or an IoT search engine such as Shodan). Modeling framework 104 can also identify both bad security practices and best security practices, e.g., based on expert domain knowledge or user input. Modeling framework 104 can encode the bad security practices as a second set of known vulnerabilities and can encode a negation of the best security practices (i.e., "not-best security practices") as a third set of known vulnerabilities.

In the dependency subgraph, modeling framework 104 can generate nodes, wherein each node represents a respective component of the system and is labeled with a dependency type and a number representing a value associated with the respective component. An exemplary multi-layer graph which includes the three subgraphs along with their respective nodes and directed edges is described below in relation to FIG. 2B.

Reasoning framework 106 can obtain or take as input the multi-layer graph constructed by the modeling framework for a system with a plurality of components. Reasoning framework 106 can also receive an optional user input 112. Reasoning framework 106 can determine constraint relationships associated with configuration parameters for the components. These constraint relationships can include security constraints and functionality constraints, as described below. The overall system can implement reasoning framework 106 by using a solver, such as an SMT solver, to determine configurations which minimize the security impact to the overall system while satisfying configuration constraints and preserving the functionality of the overall system. Reasoning framework 106 can also determine configurations which optimize or prioritize functionality constraints over security constraints, depending on a chosen "constraint relaxation strategy" (or "strategy") described in U.S. patent application Ser. No. 16/923,763. This strategy can be one of three strategies and can be chosen by a user or configured by the system based on an operational context of the overall system.

Reasoning framework 106 can establish security metrics (e.g., the probability of compromise) and performance metrics (e.g., availability, throughput, etc.), and devise a cost function based on these metrics. An exemplary method of solving the optimization problem (e.g., of finding a set of configuration parameters that both reduces the attack surface and preserves the functionality of the system) is described in U.S. patent application Ser. No. 16/219,774.

Evidence generation framework 108 can use as input the output of reasoning framework 106, and evidence generation framework 108 can produce as output an updated configuration and report 114.

Specifically, the overall system can be implemented with a scalable pipeline, which can: ingest system requirements, configuration files, software documentation and various types of configuration vulnerabilities (data ingestion framework 102); based on the data ingested in the data ingestion framework, build a queryable, graph-based representation of the relationships between configuration vulnerabilities and attack scenarios, configuration parameters, and system components (modeling framework 104); provide an application programming interface (API) to perform a quantitative, comparative analysis of the security impact of configuration settings (reasoning framework 106); automatically construct a constraint satisfaction problem based on the model and utilize a Z3 SMT solver to solve for optimal parameter values (reasoning framework 106); and provide human readable evidence about the optimality of the selected configuration (evidence generation framework 108).

Exemplary Network Diagram and Corresponding Multi-Layer Graph

Figure 2A:
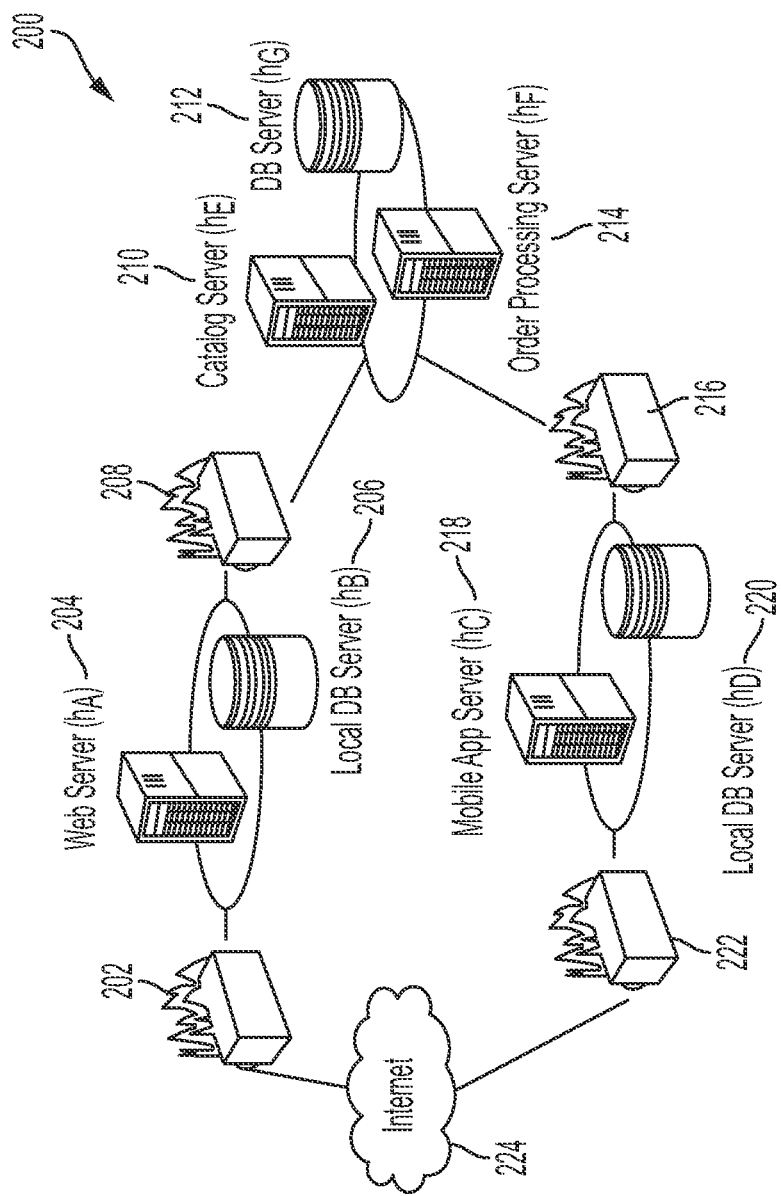
FIG. 2A illustrates an exemplary network diagram of an e-commerce system, in accordance with an embodiment of the present application.

FIG. 2A illustrates an exemplary network diagram of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figures 1, 2B:
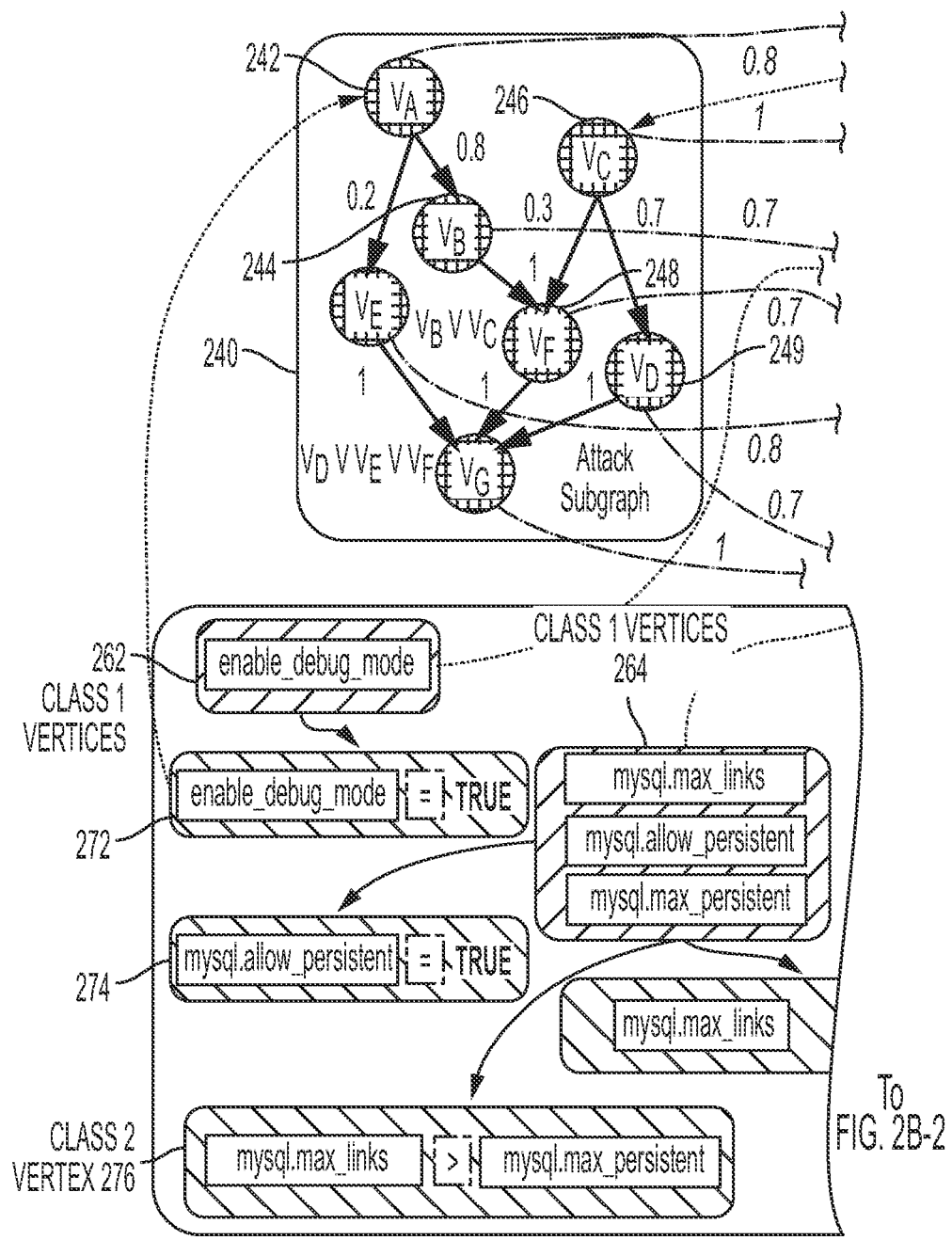
Figures 2, 2B:
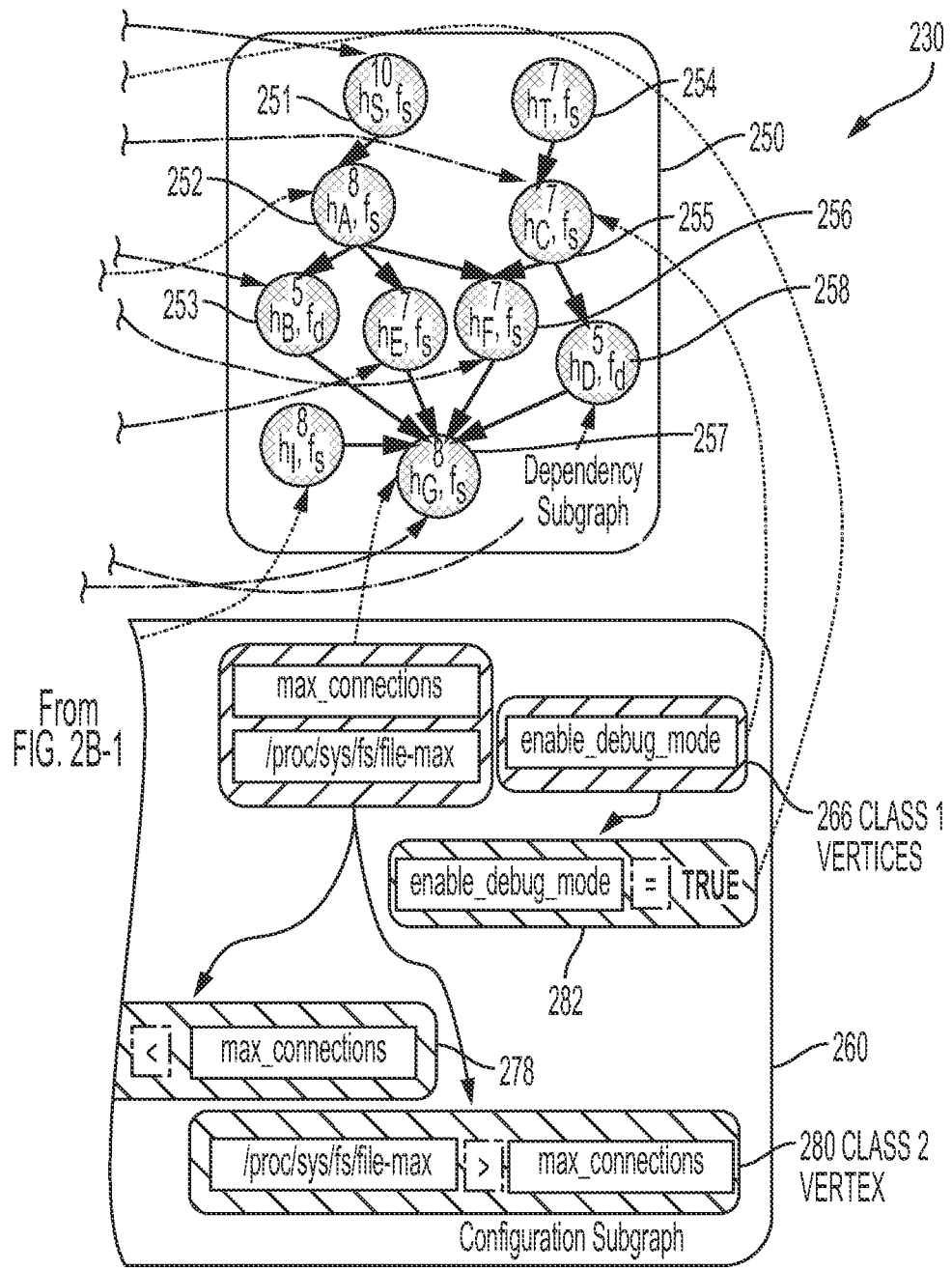

FIGS. 2B-1 and 2B-2 illustrate an exemplary multi-layer graph corresponding to the network diagram of FIG. 2A, in accordance with an embodiment of the present application. Graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

As shown in FIG. 2B-2, the dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

As shown in FIG. 2B-2, the configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration. Similar to these relationships among configuration parameters, a particular parameter assignment can also create a precondition for a vulnerability which can be exploited, thus providing an entry point into the attack subgraph.

For example, configuration subgraph 260 can include Class 1 vertices 262, 264, and 266, where each group of Class 1 vertices is depicted in its own pink-colored box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own beige-colored box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first green-colored arrow) can set the stage for the attacker to exploit the child vulnerability (a node at the end of the first green-colored arrow). Each edge is also labeled with a probability value, representing the probability of the attack progressing along that edge. The nodes and edges in attack subgraph 240 are described below.

Figure 3A:
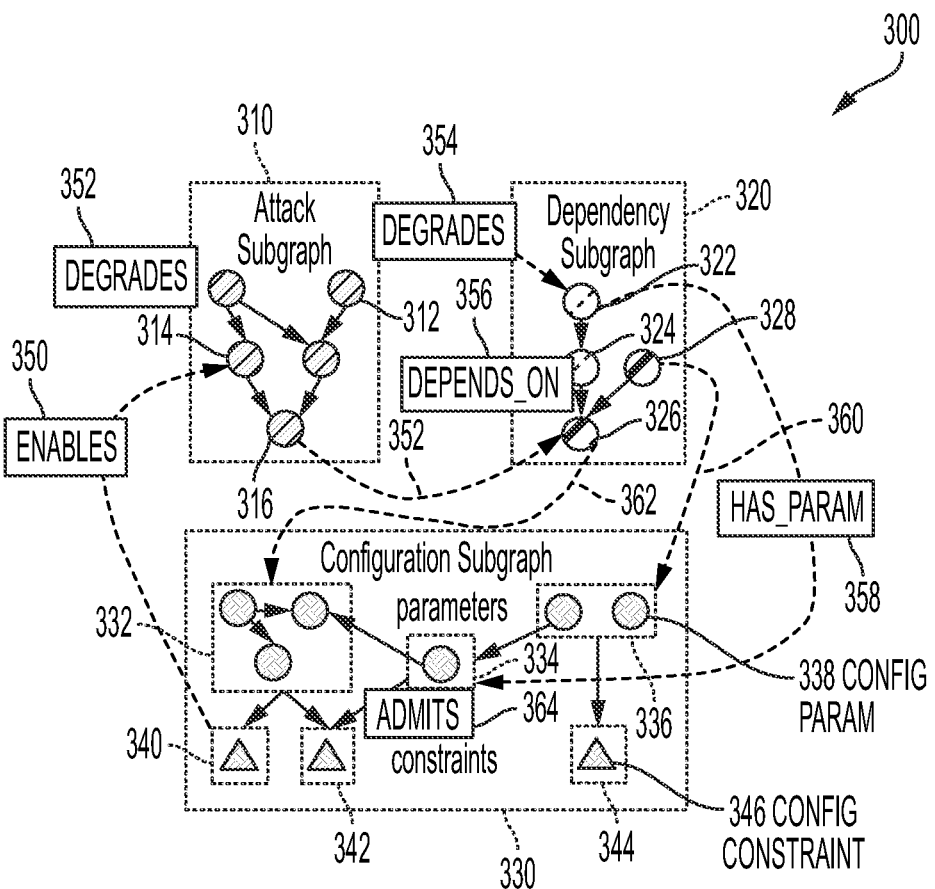
FIG. 3A illustrates an exemplary high-level diagram of a multi-layer graph, including semantics of the relationships among subgraphs, in accordance with an embodiment of the present application.

FIG. 3A illustrates an exemplary high-level diagram of a multi-layer graph, including semantics of the relationships among subgraphs, in accordance with an embodiment of the present application. Diagram 300 can include: an attack subgraph 310, with each vulnerability node depicted as a red-colored circle, and relationships between vulnerability nodes depicted as black arrows; a dependency subgraph 320, with each component node depicted as a blue-colored circle, and relationships between component nodes depicted as black arrows; and a configuration subgraph 330, with configuration parameters depicted as green-colored circles and configuration constraints depicted as green-colored triangles.

Configuration subgraph 330 can include two types of nodes or vertices, as described above in relation to FIG. 2B. "Class 1" vertices capture per-component configuration parameters, e.g., the green-colored circles in boxes 332, 334, and 336. For example, box 336 includes a configuration parameter 338, which is a Class 1 vertex. "Class 2" vertices capture relationships among (or conditions on) the configuration parameters, e.g., the green-colored triangles in boxes 340, 342, and 344. For example, box 344 includes a configuration constraint 346, which is a Class 2 vertex.

In configuration subgraph 330, relationships within and across components are depicted as black arrows between the green-colored circles, while constraints between and among the components are depicted as black arrows between the Class 1 vertices and the Class 2 vertices.

Furthermore, configuration subgraph 330 indicates several semantics regarding the relationships of the nodes within each subgraph as well as the relationships of the nodes across subgraphs, e.g., via directed edges. For example, a configuration constraint 340 enables (350, indicated by a purple dashed arrow) a vulnerability 314. A vulnerability 316 degrades (352, indicated by a purple dashed arrow) or represents the exposure factor of the component indicated by a dependency subgraph node 326 based on the exploitation of vulnerability 316. Similarly, a vulnerability 312 degrades (354, indicated by a purple dashed arrow) or represents the exposure factor of the component indicated by a dependency subgraph node 322 based on the exploitation of vulnerability 312.

In addition, dependency subgraph node 324 depends on (356, indicated with a black arrow) dependency subgraph node 326. Dependency subgraph node 322 is associated with or has parameters (358, indicated by a purple dashed line) indicated in a node of Class 1 vertices 334 (e.g., configuration parameters associated with the component represented by dependency subgraph node 322). Similarly, dependency subgraph node 328 is associated with or has parameters (360, indicated by a purple dashed line) indicated in a node of Class 1 vertices 336 (e.g., configuration parameters 338 associated with the component represented by dependency subgraph node 328). Similarly, dependency subgraph node 326 is associated with or has parameters (362, indicated by a purple dashed line) indicated in a node of Class 1 vertices 332 (e.g., configuration parameters associated with the component represented by dependency subgraph node 326).

Moreover, a configuration subgraph node of Class 1 vertex 334 identifies or admits (364, indicated with a black arrow) the relationship of the configuration parameters involved in the configuration constraint of Class 2 vertex 342.

Figure 3B:
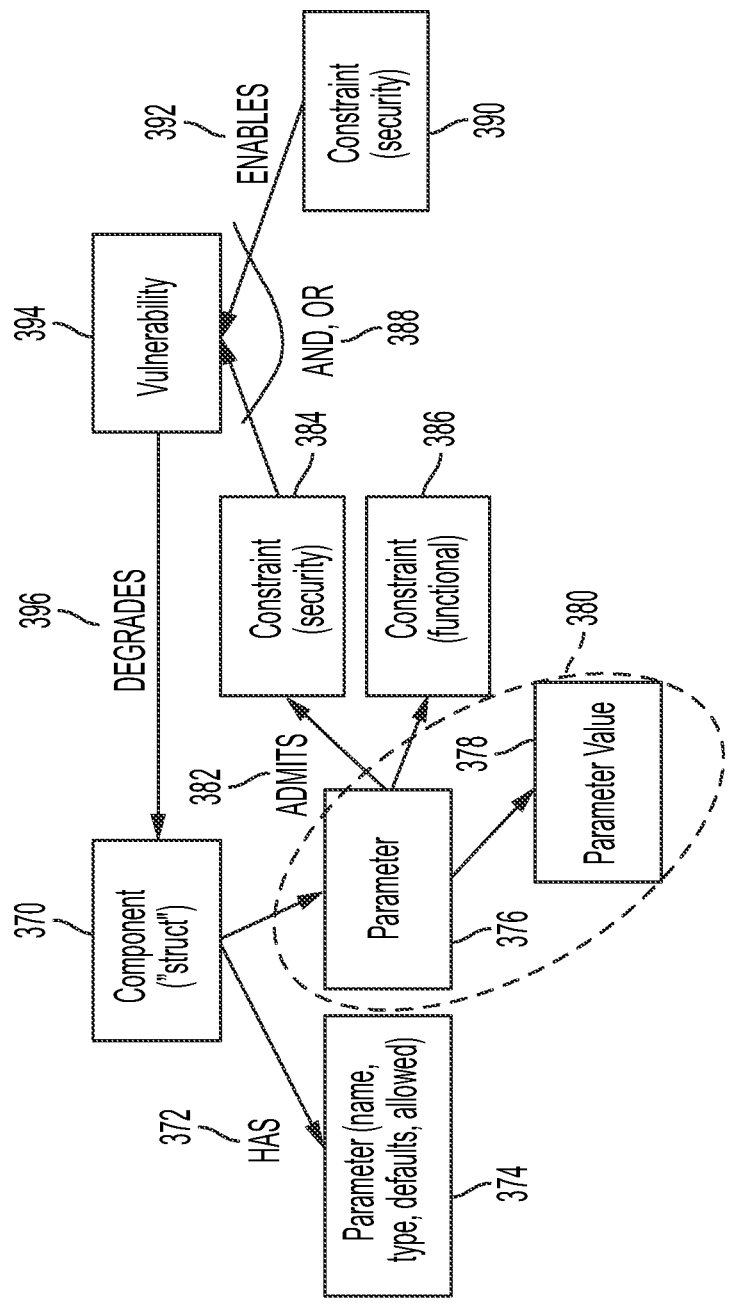
FIG. 3B illustrates an example application of the multi-layer graph shown in FIG. 3A, in accordance with an embodiment of the present application.

FIG. 3B illustrates an example application of the multi-layer graph shown in FIG. 3A, in accordance with an embodiment of the present application. In the example shown in FIG. 3B, component ("struct") 370 can represent a component in a database system that can be configured with a set of parameters 376 and a corresponding set of parameters values 378 (380 indicated with dashed-oval line). In one embodiment, the system can admit 382 a set of constraint relationships representing relationships of the configuration parameters involved in the configuration constraints 384 and 386. Component 370 has parameters 372 indicated in 374 (e.g., configuration parameters associated with component 370). Configuration constraint 384 and/or (388) configuration constraint 390 can enable (392) a vulnerability 394. Vulnerability 394 can degrade (396) or represent the exposure factor of component 370 based on the exploitation of vulnerability 394.

The example shown in FIG. 3B is related to a single component 370, however, a system may have a plurality of such components with each component configured with a set of parameters. For example, a first portion of components may represent a first router type and a second portion of components may represent a second router type. A component corresponding to the first router type can be associated with a specific router model from which a set of parameters can be derived for access control lists (ACLs), e.g., certain tokens in the ACL may have certain constrained relationships with a corresponding set of value strings. A component corresponding to the second router type may model the ACL in a way that is different from the model associated with the first router type.

To facilitate the interoperability of the first router type components and the second router type components, the system may generate a set of predicates that can establish different types of relationships between the components: first router type↔first router type; first router type↔second router type; second router type↔second router type. These relationships between the different ACLs in the first router type components and the second router type components, i.e., resulting in four different mappings for two components, may provide the right set of constraints for the configuration subgraph. However, with the increase in the number of devices/components the number of one-to-one mappings between all the devices may increase manifold, and the realization of the set of predicates can be complex and inefficient, e.g., for N number of devices/components there can be $N^2$ number of complex mappings.

Figure 4:
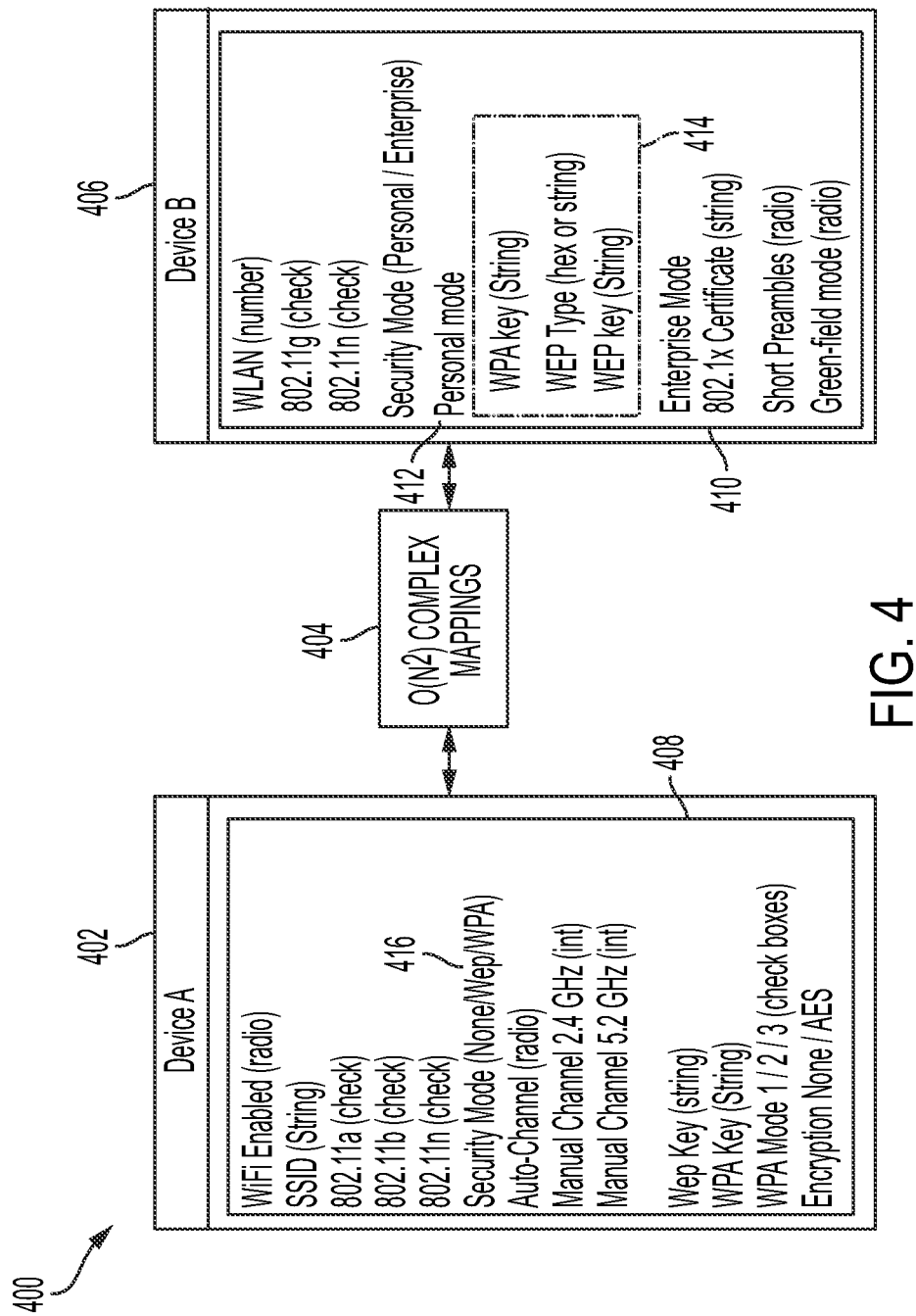
FIG. 4 illustrates an example for modeling Wi-Fi security with complex mappings between components with different sets of configuration parameters, in accordance with an embodiment of the present application.

FIG. 4 illustrates an example for modeling Wi-Fi security with complex mappings between components with different sets of configuration parameters, in accordance with an embodiment of the present application. In the example shown in FIG. 4, device A 402 models Wi-Fi with a set of parameters 408, device B 406 may model Wi-Fi differently with a different set of parameters 410. For example, device B 406 may support 802.11g instead of 802.11 a/b/n (supported on device A 402). Further, device B 406 may have security mode options for "Personal/Enterprise" whereas device A 402 may provide different options.

When the system enables "Personal mode" 412 in device B, a set of parameters 414 specific to device B are made available. A mapping between device A and device B can be possible when "Personal mode" 412 option is enabled in device B and WEP key (string) is selected. However, when option WEP type (hex) is selected on device B, no mapping can be found on device A. There can be several such constraints for mapping between any two devices.

When two devices, e.g., device A 402 and device B 406, are to be mapped, it may be desirable to develop a logic for Satisfiability Modulo Theory (SMT) in which an antecedent code can be written as a pre-condition for achieving one-to-one mapping between two devices. Currently, systems can include a common/shared resource model which can include a common specification, e.g., for modeling Wi-Fi security. The existing shared resource models can represent a one-to-one mapping between devices A 402 and device B 406.

When two or more devices have to be configured to share a resource, an all-to-all mapping is performed. For example, a system that calculates firewall rules, the system model can be specified as a set of requirement predicates and the system solves them via SMT. The system may post-process device specific configurations to output the configuration in an appropriate format, but the system may assume that all devices can support a full range of operations.

Further, with the increase in number of devices the number of mappings between all the devices in the system may increase manifold, and the code also becomes lengthy and complex, e.g., for N number of devices there can be $N^2$ number of complex mappings. To overcome the problems arising from one-to-one mapping when there is a plurality of devices in the overall system, some embodiments of the present disclosure provide a method to generate a novel shared resource model that goes beyond associating configuration parameters with predicates.

Exemplary Shared Resource Model

SCIBORG is a configuration finding process; the embodiments described herein provide an overall system that can extend the configuration finding process to include the novel shared resource models. In other words, the overall system may develop an initial shared resource model and a corresponding set of rules to solve a feasible configuration problem independent of the device constraints. The overall system may then apply the shared resource model to individual devices and apply a mapping to each device's native configuration space. The overall system can then apply rules within the device's native configuration space to ensure that the shared resource model configuration is feasible. In one embodiment, security constraints may be added at the shared resource model or at the device specific models.

Specifically, the overall system can provide a method for modeling the shared resource model. Further, when the individual devices instantiate the shared resource model, the overall system may apply SMT to solve for feasible configurations over the shared resource model. In addition, security vulnerabilities that used to be on the devices may be shifted to the shared resource model, e.g., weak passwords, while security vulnerabilities specific to the device may stay on the device, e.g., a software bug.

The embodiment described herein provide a number of use cases for the novel shared resource model. Specifically, in a peer-to-peer use case, all devices can interoperate with other devices. In a client-server use case, the server interoperates with all clients, but clients may not be required to interoperate with each other. Further embodiments address how the overall system can select preferred sets of configurations over less desirable or unallowed options, e.g., for security reasons. Modeling of the novel shared resource model is introduced and described below with reference to FIGS. 5-8.

A shared resource may be a protocol, such as the Network File System (version 4), or Wi-Fi security mechanisms such as wired equivalent privacy (WEP) or wireless protected access (WPA). The shared resource protocol may also be a shared convention, such as password policies. If two or more devices need to know the same shared secret and the administrative authority of each device has its own policies around shared secrets (e.g., length, complexity, etc.), then the intersection of those policies can be the shared resource.

Let a component or a device in the overall system be described by its make ("ma"), model ("m"), and version ("v") and be denoted as:

$$d_i = D(ma, m, v) \qquad (1)$$

For a given shared resource, R, device $d_i$ can have a relevant subset of device parameters, $DP_i(R)$, that can be device specific. The device parameters may vary for different software versions or models of the same manufacturer and may also vary for different manufactures.

Assume that the shared resource can be configured with a set of parameters specific to the resource, P(R), that can govern one or more operational modes of the shared resource. Each parameter, P(R), can be defined with a set of allowed values, AV(P(R)), i.e., the set of allowed values can represent a valid assignment for each parameter in the set of parameters P. In some cases, the set of allowed values may be a known enumerated set, e.g., encryption ciphers, whereas in other cases it may be an enumerable set, e.g., integers, whereas in other cases it may be user-input, e.g., a hostname. The set of allowed values, AV(P(R)), may also be a predicate of another parameter. For example, one such predicate can indicate that an allowed value for a first parameter must be integers and less than a value for a second parameter. The set of allowed values may also be context-dependent, e.g., if a predicate corresponding to the first parameter is "TRUE", then the second parameter can be operational and should satisfy other predicate(s); otherwise, the second parameter can be non-operational and may be assigned any value or should be a specific value.

Each device in the overall system may implement a subset of available functionalities, and hence may require a subset of available parameters or parameter values. For example, a device A (denoted as $D_A$) may only implement modes "1" and "2" of the possible four modes of a resource. In other words, the allowed values for a resource parameter, e.g., $P_1$, can be restricted in the context of device A. Specifically, the allowed values for resource parameter, $P_1$, might be $AV(P_1)=\{1, 2, 3, 4\}$, but in the context of device A, $D_A$, the allowed values for, $P_1$, might be $AV(P_1, D_A)=\{1, 2\}$.

The overall system may determine a specific resource configuration based on values assigned to each parameter, $\{V(P_i)\}$. For such a resource configuration, the overall system may have to assign specific values to a set of parameters associated with a device to realize a specified functionality. Such value assignments to a set of parameters associated with a device based on the resource configuration can be modeled as implications. For example, if a resource parameter, $P_1=2$, then device parameter $DP_1$ is set to "MODE2." However, it may be possible that there is no unique injective mapping, i.e., a mapping from the device to the shared resource, in such a case a different predicate can be applied. In other words, if resource parameters are set as: $P_1=2$ and $P_2=$"TRUE", then device parameter $DP_1$ can be set to "MODE2" and device parameter $DP_4$ can be set to $\{AES-GCM, 3DES\}$, where GCM denotes Galois/Counter Mode and DES stands for Data Encryption Standard. In this case, the system has to select a value for $DP_4$, i.e., either AES-GCM or 3DES, based on a set of device specific rules to ensure interoperability with the shared resource even if the system selected a different value for another device. Further, the system may also enable both options, i.e., both AES-GCM or 3DES, on the device for device parameter $DP_4$.

In one embodiment, the system may configure each shared resource with a specific set of rules to govern the operation of the shared resource. The system can represent the set of rules as an abstract model or as a set of predicates that relates the resource parameters and operational modes, e.g., in SMT2 or in another logic. The system may then determine a set of feasible solutions that include a subset of the resource parameter assignments that satisfy the resource models or predicates.

In addition, each device in the overall system can be defined by a model that governs the assignments to device parameters. Further, each device can also have a surjective mapping, i.e., a mapping from the shared resource to the device. A feasible solution is one that can satisfy the resource predicates and can satisfy all device predicates within the subset of parameters and values allowed by the surjective mapping. Such an approach can overcome the problems associated with all-to-all mapping of devices-to-devices and hence can implement a more scalable hub-spoke mapping.

Figure 5:
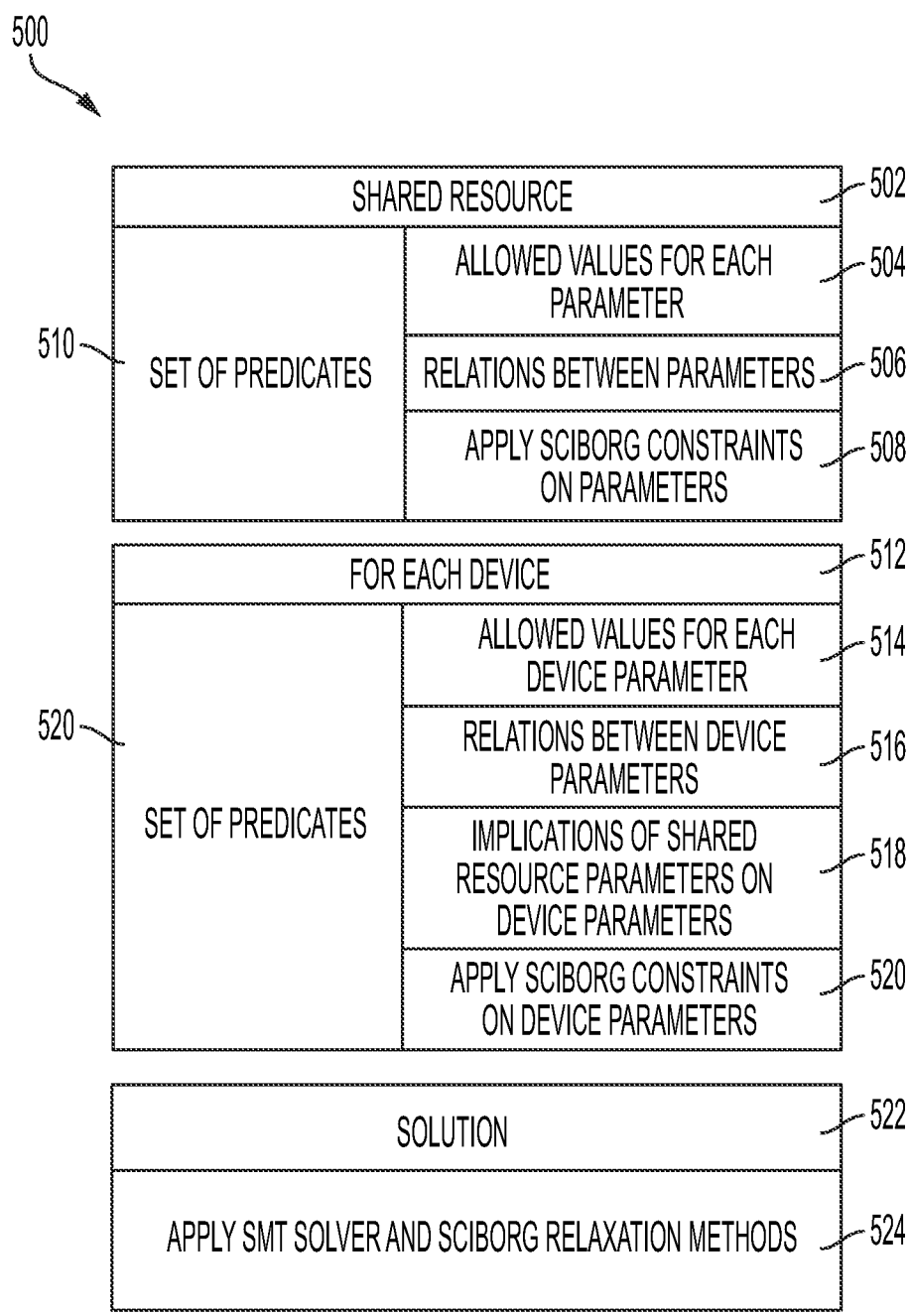
FIG. 5 illustrates an exemplary predicate logic approach for developing a shared resource model in the overall system, in accordance with an embodiment of the present application.

FIG. 5 illustrates an exemplary predicate logic approach for developing a shared resource model in the overall system, in accordance with an embodiment of the present application. In the example shown in FIG. 5, the overall system may apply a predicate logic approach 500 to realize the shared resource model 502. Specifically, the overall system may basically enumerate all the allowed values for each shared resource parameter 504. For example, in a shared resource for Wi-Fi security, the system may define a security mode with a plurality of possible modes/allowed values. The plurality of possible modes may have an abstract sort order with no special order for a preferred mode. The overall system may then define an ordering preference on the sort. In one embodiment, the overall system may configure the shared resource model with a specific preference or an expert in the subject matter may determine a preferred configuration of the shared resource model. For example, while modeling a shared resource model for Wi-Fi security, the overall system may prefer the security mode of "WPA2" instead of security mode "WPA1." The overall system may then determine one or more relationships between the resource parameters, these relationships can define an internal behavior of shared resource model 502.

In another example, a shared resource model for Network File System (NFS) version 4, can include a set of relationship constraints. Specifically, when from among a set of modes the overall system selects one mode, the overall system may have to compromise with one or more features provided by other unselected modes. Further, for a specific selection of a mode the overall system may have to select parameters from a restricted set of parameters.

The overall system may then apply SCIBORG constraints on the resource parameters 508 based on the type of relationship constraints 506. For example, there can be three devices sharing the shared resource and one device may support NFS version 3 while the other two devices may support NFS version 4. The overall system may determine that it can be a bad practice to have NFS version 3. However, since one of the devices require NFS version 3 the overall system may configure the shared resource to support this feature to satisfy the device requirements. These aspects of the shared resource model can be attributed to specific concepts relating to how the behavioral model of the shared resource operates.

The overall system may also determine a set of predicates that govern a specific device 512. Specifically, the overall system may determine a set of allowed values for each device parameter 514. The system can then determine a set of relationship constraints between device parameters 516. The system may determine the set of relationship constraints to describe a behavior of a specific device based on the shared resource model. The system can provide implications (or mappings) of shared resource parameters on the device parameters 518. For example, if the share resource security mode is set to "WPA", then on the specific device one or more relationship constraints have to be "TRUE."

The system can then apply SCIBORG constraints to the device parameters which can indicate whether some of the constraints correspond to a "Bad-Practice," "Not-Bad-Practice," and "Functional Requirement." For example, a specific device, e.g., a Wi-Fi router, may have some functional constraints that can indicate which parameters are to be set based on a setting of resource parameters in the shared resource model. Further, the overall system may indicate a "Bad-Practice" which indicates that by setting the device parameter to a specific value may result in exposing a security vulnerability. Based on this indication of the "Bad-Practice" the overall system may determine a possible set of configurations that can avoid the security vulnerability and apply appropriate changes to the shared resource model. Further, the system may determine what implications the changes made to the shared resource model may have on the other devices. Therefore, by defining the set of relationship constraints within a device/component based on the constraints defined in the shared resource model the overall system can overcome the scaling problem due to one-to-one mapping between devices.

The overall system may apply a SMT solver and the SCIBORG constraint relaxation methods (described in U.S. patent application Ser. No. 16/923,763) 524 to solve 522 the set of relationship constraints for the shared resource model and for each device. The SMT solver can find a feasible set of values that can be assigned to the set of resource parameters and the set of device parameters.

Figure 6:
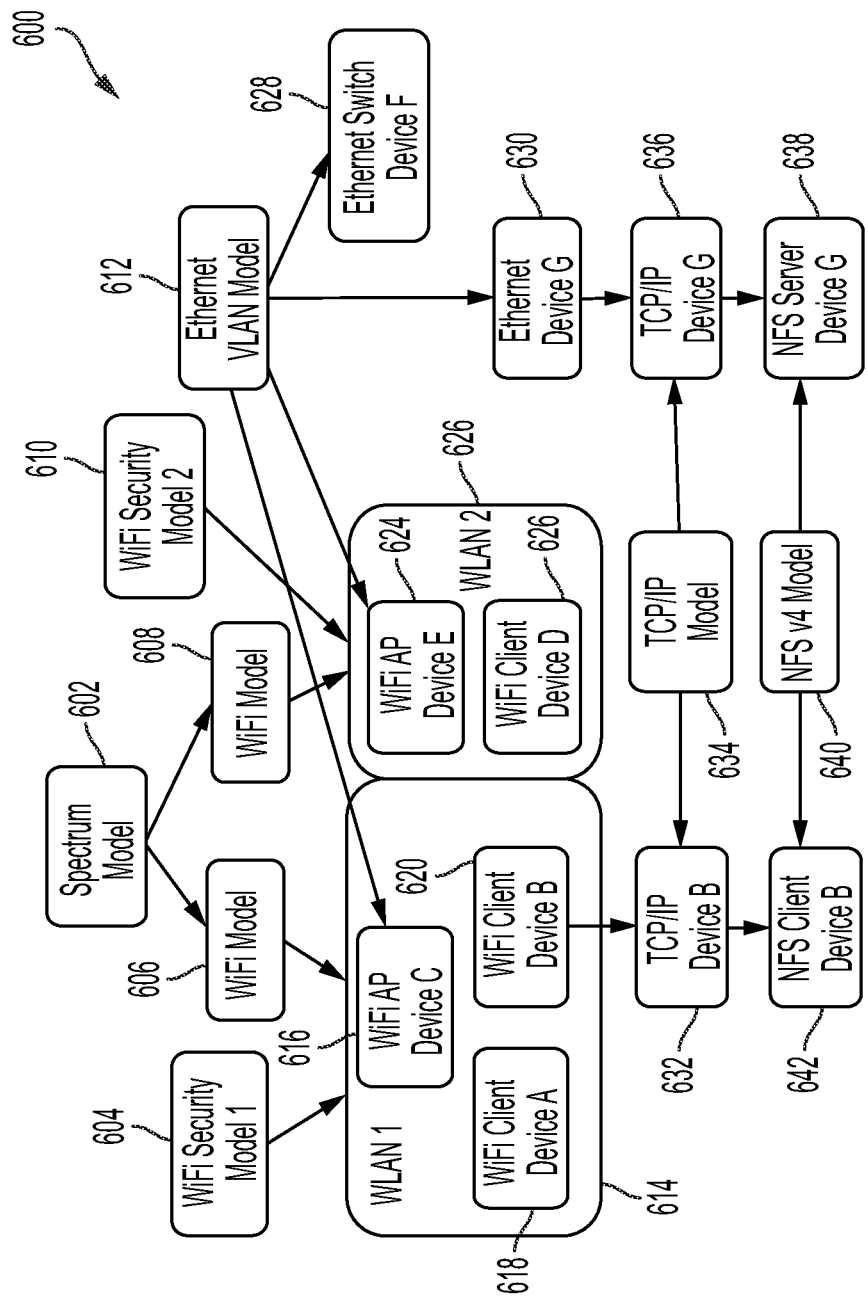
FIG. 6 illustrates an exemplary computer network including one or more shared resource models, in accordance with an embodiment of the present application.

FIG. 6 illustrates an exemplary computer network including one or more shared resource models, in accordance with an embodiment of the present application. In the example shown in FIG. 6, computer network 600 can include two Wi-Fi WLAN's, i.e., WLAN1 614 and WLAN2 622, and one Ethernet VLAN model 612 connected to Wi-Fi access points (AP's) 616 and 624. WLAN1 614 can be associated with Wi-Fi model 606 and Wi-Fi security model 1 604. WLAN2 622 can be associated with a different Wi-Fi model 608 and a different Wi-Fi security mode 2 610. WLAN2 622 may not necessarily interoperate with WLAN1 614. But Wi-Fi AP device E 624 and Wi-Fi client device D 626 should be able to interoperate with each other, i.e., devices in a WLAN must be able to interoperate with the AP specific to the WLAN.

The two WLAN's, i.e., WLAN1 614 and WLAN2 622, however, have a common resource, i.e., the radio frequency (RF) spectrum, due to which they share a spectrum model 602 which can be a shared resource model for two different Wi-Fi models 606 and 608. Wi-Fi model 606 may correspond to one user-specific spectrum and Wi-Fi model 608 may correspond to another user-specific spectrum associated with spectrum model 602. For example, device C 616 may instantiate spectrum model 602 with a specific type, e.g., 802.11a, while device E 624 may select a different aspect, e.g., 802.11g, of spectrum model 602. Spectrum model 602 might take into consideration factors other than radio channels, e.g., modulations, geo-location, power, etc. In the example shown in FIG. 6, one shared resource model, e.g., Wi-Fi model 606, may depend on another shared resource model, i.e., spectrum model 602.

The two Wi-Fi AP's, i.e., 616 and 624, can connect to a VLAN-aware Ethernet switch 628. Since all the devices have to agree on a common VLAN configuration, they share a VLAN model, i.e., Ethernet VLAN model 612, that can take into consideration VLAN trunking protocols, tagging mechanisms, or VLAN numbers.

In addition to the two security models, i.e., 604 and 610, computer network 600 can include a common TCP/IP model 634 and a common NFS v4 model 640. For NFS client device B 642 to be able to communicate with NFS server device G 638, both the devices share a common model for interoperability. When NFS client device B 642 has to communicate with NFS server device G 638 which is associated with ethernet VLAN model 612, NFS server device G 638 may only determine whether ethernet VLAN model 612 is compatible between Wi-Fi AP device 624 and server 638. Devices 638 and 642 may rely on TCP/IP related parameters associated with devices 636 and 632, hence they can share a common TCP/IP model 634. This ensures they use compatible settings, such as TCP options, IP fragmentation, and so forth. They also share a common NFS v4 model 640, so device B 642 is operated in a compatible mode to device G 638. The system might also consider operational constraints, e.g., device B 642 can have access to a particular share on device G 638.

Figure 7:
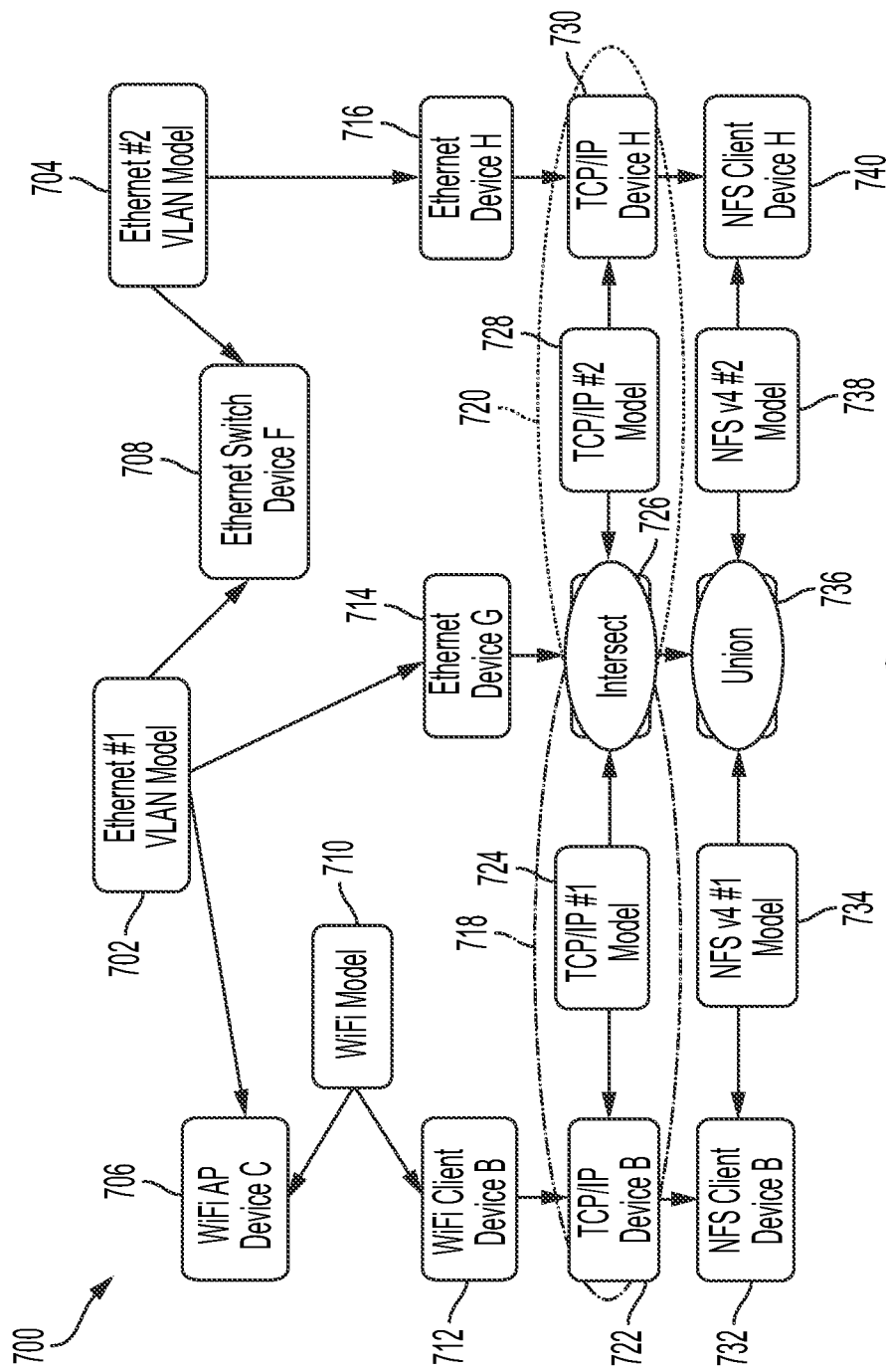
FIG. 7 illustrates an exemplary computer network including a common resource model representing an intersection of allowable parameters on two different models and another common resource model representing a union of allowable parameters, in accordance with an embodiment of the present application.

FIG. 7 illustrates an exemplary computer network including a common resource model representing an intersection of allowable parameters on two different models and another common resource model representing a union of allowable parameters, in accordance with an embodiment of the present application. Computer network 700 can include two TCP/IP models, i.e., 724 and 728, and can have a common shared model as an intersection of allowable parameters 726, thereby allowing interoperability between the two TCP/IP models. But NFS models, i.e., 734 and 738, may allow negotiation of parameters, e.g., a server might be configured with the union 736 of two NFS models. In one embodiment, the system may provide a set of rules to indicate how the different models can be combined to form a common resource model, e.g., the rules in some models may indicate an intersection of allowable parameters whereas the rules in some other models may indicate a union of allowable parameters. A number of examples are described below regarding different uses cases for the novel shared resource model.

In the example shown in FIG. 6 and FIG. 7, the overall system can operate for peer-to-peer resources in which all the devices have to interoperate over a common channel. Shared resources may not require all-to-all sharing. For example, an NFS server may operate in several concurrent modes and different clients may choose one mode or another. Furthermore, clients may not be required to communicate with other clients which can also be applicable for AP Wi-Fi networks. The AP may operate in a plurality of modes such that several different client configurations can connect, and clients may not require to interoperate with other clients.

Further to this example, the server device may operate with multiple concurrent profiles. A profile is an operational mode that uses specific combinations of parameter values. The set of concurrent profiles might not be enumerated in a straight-forward manner but could be the cross product of various settings. For example, a VPN server might support several different key exchange protocols, digest algorithms, and ciphers. A VPN client could connect using any choice from the three categories. The difference here is that a surjective mapping from the shared resource to a device does not need to result in a permissive choice at the device. The device may choose any restricted set of parameters that allow interoperation with the resource. Two devices sharing the resource may not be required to select interoperable values. For example, a web server, (represented as a shared resource), may support Transport Layer Security (TLS) versions 1.2 and 1.3, and the overall system may configure the clients to support either one of them, and can exclude older TLS versions from the available choices. However, in case there exists a client that only supports an older version, e.g., TLS 1.0, the overall system may configure the server to support TLS versions 1.0 and 1.3. By doing so, the overall system may config one client to support TLS 1.0 while all other clients may only support TLS 1.3. Therefore, the overall system while ensuring that all other clients, i.e., configured for TLS 1.3, have a good encryption it can still support TLS 1.0.

In another example, a printer server may be required to support one set of printers that support Internet Printing Protocol (IPP) over Secure Sockets Layer (SSL). However, there can be some legacy printers that may only support Line Printer Remote (LPR) over TCP. In the shared resource model, the printer server may select both IPP-SSL and LPR-TCP, but SCIBORG, i.e., the overall system, may only apply the LPR-TCP model to those legacy printers that specifically need or support it, and may apply IPP-SSL to all other printers that support IPP-SSL.

In another use-case example, a computer network may include a shared resource associated with a file transfer protocol (FTP) site. There may be two client devices desiring to access the FTP site with a same username and password. A third device can be an FTP server. Let the three devices be denoted as D1, D2, and D3. Let each device have its own administrative authority, denoted as A1, A2, and A3. The password must comply with the password policy of A3, as it owns the server. The password policy, however, would preferentially satisfy the policies of A1 and A2. In some cases, A1 or A2 might choose to not use the service on A3 if the password does not satisfy their policy.

When the reasoning logic in the overall system generates and assigns a specific password to the password parameter on devices D1, D2, and D3, the password may get exposed to the reasoning system and may require the password to be transmitted to each device later. To overcome this security problem, one embodiment described herein can provide an overall system that can develop a shared resource to represent a password policy. Administrative domains/authorities A1, A2, and A3 may have password policies PP1, PP2, and PP3, respectively. The overall system may determine complying policies that can jointly satisfy the administrative domains. In one approach, the overall system can consider PP3 to be the resource model while PP1, and PP2 can be the specializations. In another approach, the overall system may develop a universal password resource PP and can have the three policies as specializations.

A password policy may have multiple dimensions, such as: minimum length, maximum length, recommended length, character set, minimum number of characters from subsets (e.g., number of caps or numbers), not matching username, not matching personal information, not a previous password, complexity, not in a word list, not in a dictionary with substitution rules, not matching a Markov chain of character patterns, and various types of entropy measures. Clearly, a password policy may be complex, and some password policies may require prior state information, e.g., not matching a previous password. To combine multiple password policies, some dimensions might be a set intersection and others might be a minimum or maximum.

Another application of the novel shared resource model is to consider a preferred subset of values for the shared resource model. For example, the overall system may configure a device with a set of allowed values and can configure the associated shared resource with a set of choices for the allowed values. In a common configuration security problem, the system may exclude weak choices, allow a subset of choices, and may prefer a set of strong choices, e.g., the system may prefer a 256-bit Advanced Encryption Standard (AES) cipher instead of a 128-bit AES cipher. Set theory can be used to describe this common configuration security problem and can be solved in SMT via a set logic.

First the problem can be represented as a set of allowed values on a device versus the good choices, this representation can be later extended to a set of bad choices. For a shared resource R (e.g., secure shell (ssh) channels), there can be an ssh-cipher sub-resource R', and a set S can represent a universe of possible assignments. Set S could be constructed empirically based on each system and how the system represents each cipher or based on some standard mechanism like object identifiers (OIDs).

For such a shared resource model, the overall system can determine constraint relationships based on what modes of sub-resource R'a device D can support instead of being based on a specific parameter P on device D. The overall system might support those modes by configuring several native parameters, but that can be a device-specific implementation detail of R and R'. In one embodiment, the overall system may want to allow each device to have its device-specific native representation of a shared resource and explicitly separate such a representation from the shared model of R or R'. In the following paragraphs the common configuration security problem and an associated SMT solution is described via set theory.

A shared resource in a system can be denoted as S. A set of allowed values on a device D for the shared resource S can be represented as $S_{DA}$. $S_{DC}$ can denote a set of values configured on device D, $S_{DD}$ can denote a set of default values on device D. Set of default values $S_{DD}$ can be selected if there are no configured values on device D, i.e., if $S_{DC}=\{\ \}$. $S_{DE}$ can represent a set of effective assignment of values on device D that can be based on $S_{DC}$ and $S_{DD}$. A set of "good" values from shared resource S is denoted as $S_G$. Table 1 below illustrates a relationship between the above-described parameters in set theory.

When an intersection of the set of "good" values on the shared resource and the set of allowed values on device D is empty, i.e., $S_G \cap S_{DA}=\{\ \}$, device D may not support any of the "good" values. If $S_{DE} \subseteq S_G$, then the system may select different strategies to find a solution. Table 2 below describes the different strategies via set theory.

TABLE 1

Relationship between parameters represented via set theory.
RELATIONSHIP BETWEEN PARAMETERS $S_{DA} \subseteq S$
$S_{DC} \subseteq S_{DA} \cup \{\ \}$
$S_{DD} \subseteq S_{DA} \cup \{\ \}$
$S_{DE} \leftarrow$ IF $S_{DC} \subseteq \{\ \}$
THEN $S_{DD}$ ELSE $S_{DC}$
$S_G \subseteq S$

TABLE 2

Description of different strategies via set theory
DESCRIPTION OF THE STRATEGIES If $S_{DE} \cap S_G \nsubseteq \{\ \}$, then this intersection of values can be considered
If $S_{DE} \cap S_G \subseteq \{\ \}$, then check $S_{DA} \cap S_G$. If the result is non-empty, then the resulting non-empty set of values can be considered
If $S_{DA} \cap S_G \subseteq \{\ \}$, then there can exist no "good" assignment for device D In one embodiment, an overall system might consider all sub-systems that would access the same shared resource, e.g., shared resource R'. The overall system can include a client-server representation of a set of clients and a set of servers. For example, a set of ssh clients accessing a set of ssh servers. Let the servers be denoted as $H=\{H_1, \ldots, H_m\}$ and the clients as $T=\{T_1, \ldots, T_n\}$. The set of clients may only be communicating with the set of servers and the clients may not communicate with other clients (or if the clients communicate with other clients, then they could be in both sets). The overall system may determine an existence of a feasible solution. Specifically, the system may determine $S_{all\_A}=\cap_x\{H, T\}S_{x\_A}$, i.e., an intersection of allowed values over all sub-systems. If $S_{all\_A} \subseteq \{\}$, then there can be no universal feasible solution. However, such a universal solution may not be required.

Further, the overall system can determine a pairwise feasibility condition. For example, for all $(t \in T, h \in H)$: $S_{tA} \cap S_{hA} \subseteq$, i.e., there exists at least one cipher in a client that each server supports. If this feasibility condition is satisfied, then there is at least a valid assignment (if not a "good" one). In other words, what is desired is for all $(t \in T, h \in H)$: $S_{tA} \cap S_{hA} \cap S_G \subseteq \{\}$. If the "good" subset is non-empty, then the overall system may consider them. Let $S_{(t,h)_G}$ denote the "good" assignments that can be available on the t–h shared resource R'. Now, $S_{tC} \zeta U_{\{h \in H\}} S_{(t,h)_G}$ can denote a union of all "good" assignments for all servers to client t; $S_{hC} \zeta U_{\{t \in T\}} S_{(t,h)\_G}$ can denote a union of all "good" assignments for all clients to server h.

Further, the system might need a set of equivalence relations between ciphers. For example, all 256-bit AES ciphers can be in category one and all 128-bit AES ciphers can be in category two, and all other ciphers can be in category three. One possible constraint can be that the system may allow any cipher in category one or two but may prefer to have only category one.

In one embodiment, the system may exclude a set of bad choices, allow a set of acceptable choices, and prefer a set of "good" choices to solve the configuration problem. In the above-described example, a set of bad choices, i.e., $S_{DB}$, can be removed from the allowed choices, i.e., $S_{DA} \zeta S_{DA} \backslash S_{DB}$, and then system may solve the configuration problem.

Figure 8:
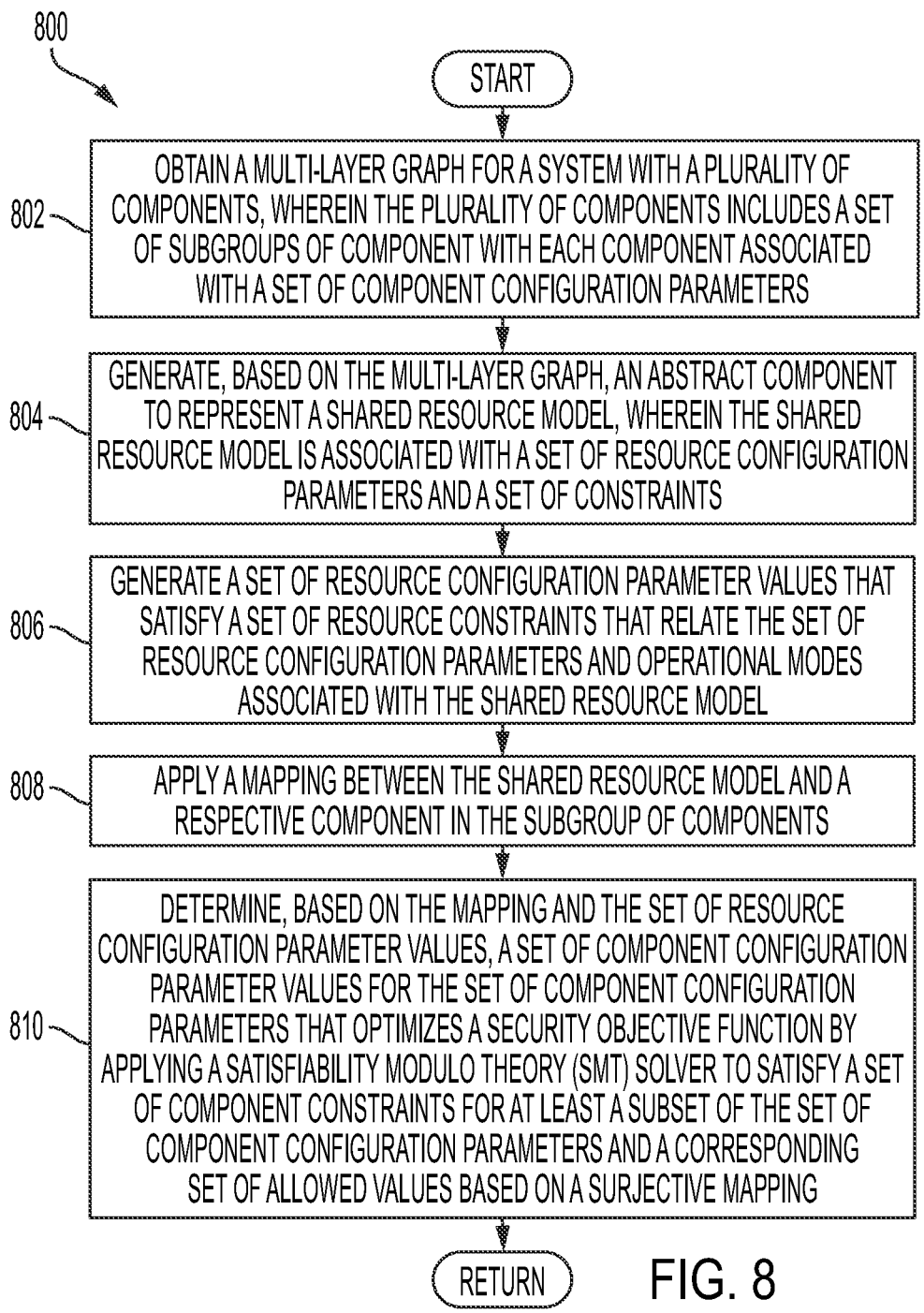
FIG. 8 presents a flow chart illustrating a method for modeling a shared resource in a multi-layer reasoning graph based on configuration security, in accordance with an embodiment of the present application.

FIG. 8 presents a flow chart illustrating a method for modeling a shared resource in a multi-layer reasoning graph based on configuration security, in accordance with an embodiment of the present application. During operation, the overall system can obtain a multi-layer graph representing an overall system with a plurality of components (operation 802). The plurality of components can be grouped into a number of sub-group of components with each component associated with a set of component configuration parameters. A component can include one or more of: a software component; a hardware component; a middleware component; and a networking component. The system can generate, based on the multi-layer graph, an abstract component to represent a shared resource model (operation 804). The shared resource model can be associated with a set of resource configuration parameters and a set of resource constraints. The system can then generate a set of resource configuration parameter values that satisfy the resource constraints. The resource constraints relate the resource configuration parameter values and operational modes associated with the shared resource model (operation 806).

The system can create and apply a mapping between the shared resource model parameters and actual configuration parameters on a respective component in the subgroup of components (operation 808). The mapping can be one or more of: an injective mapping from a respective component in the subgroup of components to the shared resource model; and a surjective mapping from the shared resource model to the respective component. The system can then determine, based on the mapping and the set of resource configuration parameter values, a set of component configuration parameter values for the set of component configuration parameters that can optimize a security objective function (operation 810). The system can satisfy the security objective function by applying a SMT solver to satisfy a set of component constraints for at least a subset of the component configuration parameters and a corresponding set of allowed values based on a surjective mapping.

Exemplary Distributed Computer System

Figure 9:
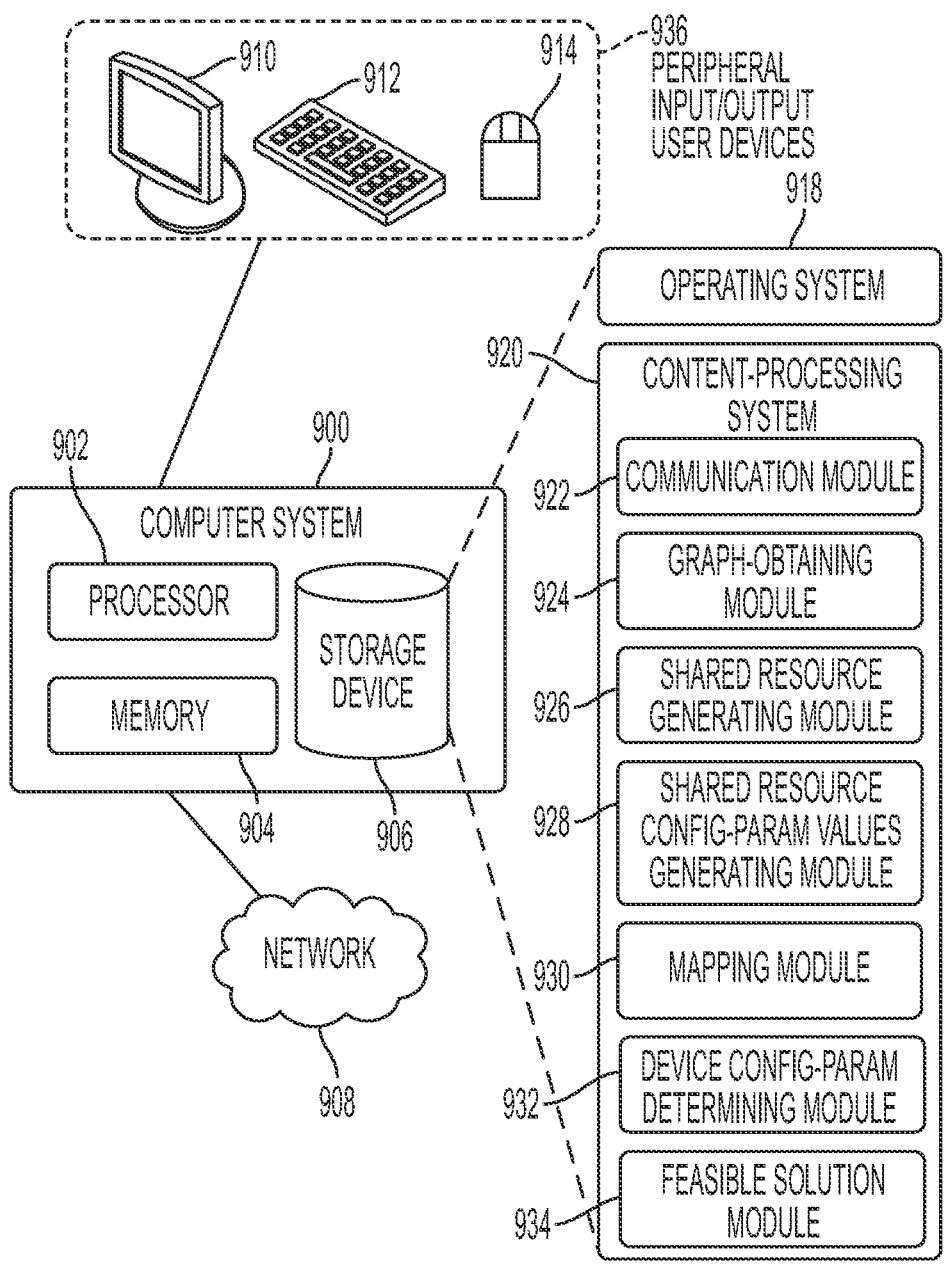
FIG. 9 illustrates an exemplary distributed computer and communication system that facilitates modeling of a shared resource in a multi-layer reasoning graph based on configuration security, in accordance with an embodiment of the present application.

FIG. 9 illustrates an exemplary distributed computer and communication system that facilitates modeling of a shared resource in a multi-layer reasoning graph based on configuration security, in accordance with an embodiment of the present application. Computer system 900 includes a processor 902, a memory 904, and a storage device 908. Memory 904 can include a volatile memory (e.g., RAM) that serves as a managed memory, and can be used to store one or more memory pools. Furthermore, computer system 900 can be coupled to peripheral input/output (I/O) user devices 936, e.g., a display device 910, a keyboard 912, and a pointing device 914, and can also be coupled via one or more network interfaces to a network 908. Storage device 606 can store instructions for an operating system 918 and a content processing system 920.

In one embodiment, content processing system 920 can include instructions, which when executed by processor 902 can cause computer system 900 to perform methods and/or processes described in this disclosure. Content processing system 920 can include a communication module 922 for sending and/or receiving/obtaining data packets to/from other network nodes across a computer network. Content processing system 920 can further include instructions implementing a graph obtaining module 924 for obtaining a multi-layer graph for a system with a plurality of components.

Content processing system 920 can include a shared resource generating module 926, which can generate an abstract component in a system to represent a shared resource model for a specific sub-group of components in the system. The shared resource model can be associated with a set of resource configuration parameters and a set of resource constraints. Shared resource config-param generating model 928 can generate a set of resource configuration parameter values that satisfy the resource constraints.

Content processing system 920 can include a mapping module 930 to apply a mapping between the shared resource model and a respective component in the subgroup of components. A device config-param determining module 932 can determine, based on the mapping and the set of resource configuration parameter values, a set of component configuration parameter values for the set of component configuration parameters. Content processing system 920 can further include a feasible solution module 934 to optimize a security objective function that satisfies a set of component constraints for at least a subset of the set of component configuration parameters and a corresponding set of allowed values based on a surjective mapping.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
obtaining a multi-layer graph for a system with a plurality of components, wherein the plurality of components includes a set of subgroups of components with each component associated with a set of component configuration parameters;
generating, based on the multi-layer graph, an abstract component to represent a shared resource model for a respective subgroup of components, wherein the shared resource model is associated with a set of resource configuration parameters and a set of resource constraints indicating relationships between the resource configuration parameters;
generating a set of values for the resource configuration parameters to satisfy the resource constraints, by:
determining a set of allowed values for a respective resource configuration parameter;
determining a set of relationships between the set of resource configuration parameters; and
applying, based on the set of relationships, the set of resource constraints on the set of resource configuration parameters, wherein the constraints include security constraints and functionality constraints, wherein the functionality constraints represent functionality requirements associated with the shared resource model;
applying a mapping between the shared resource model and a respective component in the subgroup of components; and
determining, based on the mapping and the set of values for the resource configuration parameters, a set of values for the component configuration parameters, thereby facilitating optimization of a security objective function.

2. The computer-implemented method of claim 1, wherein a component includes one or more of: a software component; a hardware component; a middleware component; and a networking component.

3. The computer-implemented method of claim 1, wherein the security objective function comprises reducing a size of an attack surface of the system.

4. The method of claim 1, wherein determining, based on the mapping and the set of values for the resource configuration parameters, the set of values for the component configuration parameters, thereby facilitating optimization of the security objective function, comprises:
determining a set of allowed values for each component configuration parameter in the set of component configuration parameters;
determining a set of relationships between the set of component configuration parameters;
determining an implication of the set of resource configuration parameters on the set of component configuration parameters; and
applying, based on the set of relationships, a set of component constraints to the set of component configuration parameters, wherein the component constraints include security constraints and functionality constraints, and wherein the functionality constraints positively express functionality requirements associated with the component.

5. The computer-implemented method of claim 4, wherein the security constraints include one or more of:
a positive expression of known security vulnerabilities or negation of predicates corresponding to the known security vulnerabilities, wherein the known security vulnerabilities are obtained from a public or a proprietary database;
a positive expression of bad security practices or a negation of predicates corresponding to the bad security practices; and
a positive expression of best security practices or a negation of predicates corresponding to the best security practices.

6. The computer-implemented method of claim 1, wherein determining, based on the mapping and the set of values for the resource configuration parameters, the set of values for the component configuration parameters thereby facilitating optimization of the security objective function comprises:
applying a Satisfiability Modulo Theory (SMT) solver.

7. The computer-implemented method of claim 6, wherein applying the Satisfiability Modulo Theory (SMT) solver comprises:
satisfying the component constraints and the resource constraints for at least a subset of the set of component configuration parameters and a corresponding set of values allowed by a surjective mapping.

8. The computer-implemented method of claim 1, wherein the shared resource model includes one or more of:
an intersection of two or more shared resource models; and
a union of two or more shared resource models.

9. The computer-implemented method of claim 1, wherein applying a mapping between the shared resource model and the respective component in the subgroup of components comprises one or more of:
an injective mapping from a respective component in the subgroup of components to the shared resource model; and
a surjective mapping from the shared resource model to the respective component.

10. A computer system, comprising:
a processor;
a storage device storing instructions that when executed by the processor cause the processor to perform a method, the method comprising:
obtaining a multi-layer graph for a system with a plurality of components, wherein the plurality of components includes a set of subgroups of components with each component associated with a set of component configuration parameters;

generating, based on the multi-layer graph, an abstract component to represent a shared resource model for a respective subgroup of components, wherein the shared resource model is associated with a set of resource configuration parameters and a set of resource constraints indicating relationships between the resource configuration parameters;

generating a set of values for the resource configuration parameters that satisfy the resource constraints, by:
  determining a set of allowed values for a respective resource configuration parameter;
  determining a set of relationships between the set of resource configuration parameters; and
  applying, based on the set of relationships, the set of resource constraints on the set of resource configuration parameters, wherein the constraints include security constraints and functionality constraints, wherein the functionality constraints represent functionality requirements associated with the shared resource model;

applying a mapping between the shared resource model and a respective component in the subgroup of components; and determining, based on the mapping and the set of values for the resource configuration parameters, a set of values for the component configuration parameters thereby facilitating optimization of a security objective function.

11. The computer system of claim 10, wherein a component includes one or more of: a software component; a hardware component; a middleware component; and a networking component.

12. The computer system of claim 10, wherein the security objective function comprises reducing a size of an attack surface of the system.

13. The computer system of claim 10, wherein determining, based on the mapping and the set of values for the resource configuration parameters, the set of values for the component configuration parameters thereby facilitating optimization of the security objective function, comprises:
  determining a set of allowed values for each component configuration parameter in the set of component configuration parameters;
  determining a set of relationships between the set of component configuration parameters;
  determining an implication of the set of resource configuration parameters on the set of component configuration parameters; and applying, based on the set of relationships, a set of component constraints to the set of component configuration parameters, wherein the component constraints include security constraints and functionality constraints, and wherein the functionality constraints represent functionality requirements associated with the component.

14. The computer system of claim 13, wherein the security constraints include one or more of:
  a positive expression of known security vulnerabilities or negation of predicates corresponding to the known security vulnerabilities, wherein the known security vulnerabilities are obtained from a public or a proprietary database;
  a positive expression of bad security practices or a negation of predicates corresponding to the bad security practices; and
  a positive expression of best security practices or a negation of predicates corresponding to the best security practices.

15. The computer system of claim 10, wherein determining, based on the mapping and the set of values for the resource configuration parameters, the set of values for the component configuration parameters thereby facilitating optimization of the security objective function comprises:
  applying a Satisfiability Modulo Theory (SMT).

16. The computer system of claim 15, wherein applying the Satisfiability Modulo Theory (SMT) solver comprises:
  satisfying the component constraints and the resource constraints for at least a subset of the set of component configuration parameters and a corresponding set of values allowed by a surjective mapping.

17. The computer system of claim 10, wherein the shared resource model includes one or more of:
  an intersection of two or more shared resource models; and
  a union of two or more shared resource models.

18. The computer system of claim 10, wherein applying a mapping between the shared resource model and the respective component in the subgroup of components comprises one or more of:
  an injective mapping from a respective component in the subgroup of components to the shared resource model; and
  a surjective mapping from the shared resource model to the respective component.

* * * * *